United States Patent [19]

MacMenigall

[11] Patent Number: 5,226,254
[45] Date of Patent: Jul. 13, 1993

[54] ASSEMBLY FOR INSECT TRAP

[76] Inventor: William H. MacMenigall, 35 Mable Street, Rosettenville, Johannesburg, South Africa

[21] Appl. No.: 865,244

[22] Filed: Apr. 8, 1992

[30] Foreign Application Priority Data

Apr. 8, 1991 [ZA] South Africa ............... 91/2584
Apr. 8, 1991 [ZA] South Africa ............... 91/2585

[51] Int. Cl.$^5$ ........................... A01M 1/10
[52] U.S. Cl. ........................... 43/107; 43/118; 43/122
[58] Field of Search ................ 43/107, 118, 122

[56] References Cited

U.S. PATENT DOCUMENTS

| | | | |
|---|---|---|---|
| 1,005,530 | 10/1911 | Fritsch | 43/107 |
| 1,772,989 | 8/1930 | Emley | 43/107 |
| 4,501,088 | 2/1985 | Boisvert | 43/118 |
| 4,706,410 | 11/1987 | Briese | 43/107 |
| 4,873,787 | 10/1989 | Schneidmiller | 43/107 |
| 4,899,485 | 2/1990 | Schneidmiller | 43/107 |

Primary Examiner—Kurt C. Rowan
Attorney, Agent, or Firm—Young & Thompson

[57] ABSTRACT

An assembly for an insect trap including a curvilinear cover member having an inlet for attracted insects is set forth. The inlet is adapted to prevent return of trapped insects through the inlet. Also set forth is a bag having a mouth, the bag having a band below the mouth, the band being peripherally expandable to be forced over the periphery of the cover and to conform with the shape of said periphery. Finally a ring-like element C-shaped in cross section is adapted to clamp the mouth of the bag between said element and the cover.

2 Claims, 4 Drawing Sheets

ASSEMBLY FOR INSECT TRAP

This invention relates to an assembly for an insect trap.

According to the invention an assembly for an insect trap includes a curvilinear cover member having an inlet for attracted insects, the inlet being adapted to prevent return of trapped insects through the inlet, and a bag whose mouth is adapted to be clamped between the cover and a ring-like element.

The ring-like element may engage a peripheral flange of the cover and in a preferred form of the invention the flange depends downwardly.

In an alternative form of the invention the ring-like element is a hollow beading which is resiliently engageable with the periphery of the cover so that the bag is anchored between it and the periphery. The beading may be of C-shaped cross section and resilient in both the longitudinal and cross sectional directions. The cover may have a peripheral ridge formation corresponding with the interior of the C.

The bag may include a band below the mouth, the band being peripherally expandable so that it can be forced over the periphery of the cover to conform with the shape of the periphery. This band may conveniently take the form of a series of vertical slits.

A line of weakness may be located below the mouth of the bag so that the zone above the line of weakness may be removed after location of the bag on the cover. Vertical lines of weakness may also be provided extending from the edge of the mouth to the first mentioned line of weakness.

The line of weakness may be located a short distance above the band.

EMBODIMENT OF THE INVENTION

An embodiment of the invention will be described with reference to the accompanying drawings in which.

Figure 1:
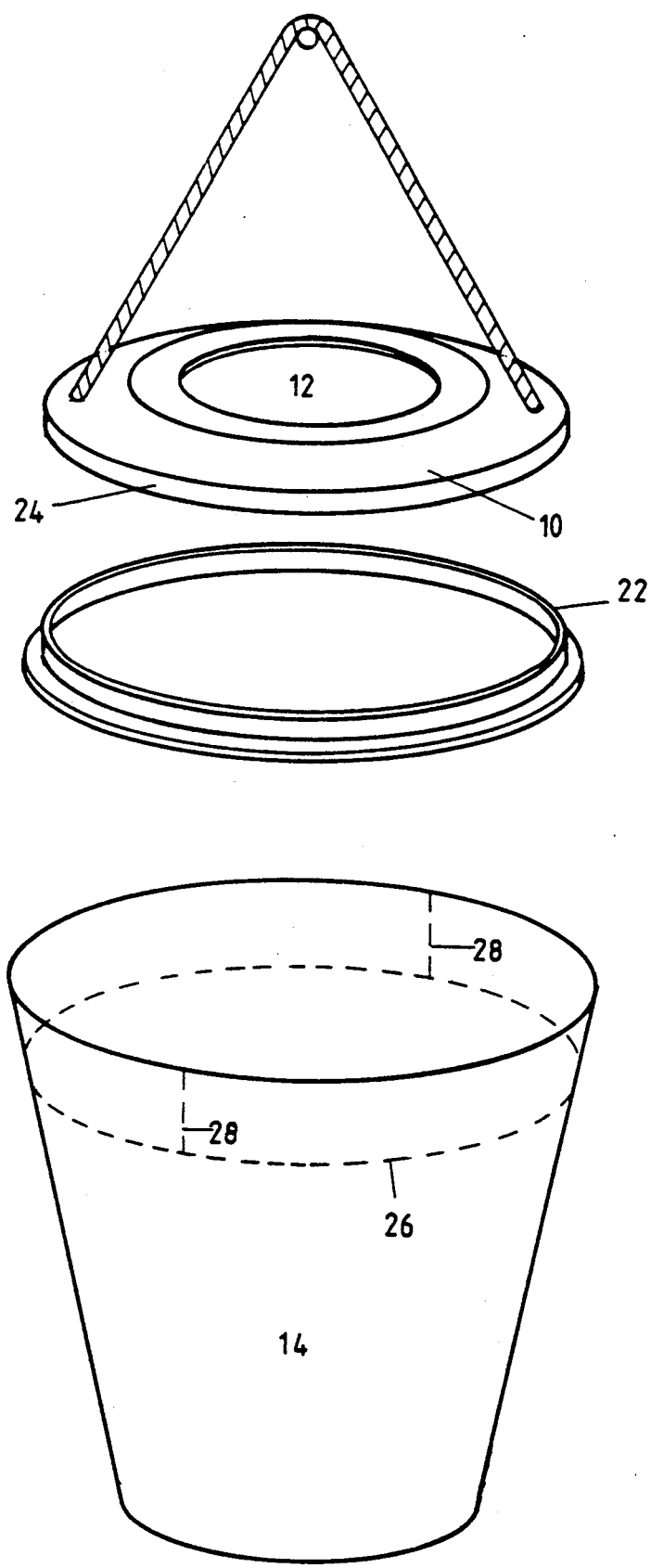
FIG. 1 is an exploded isometric view of the main components of an assembly according to the invention.
Figure 2:
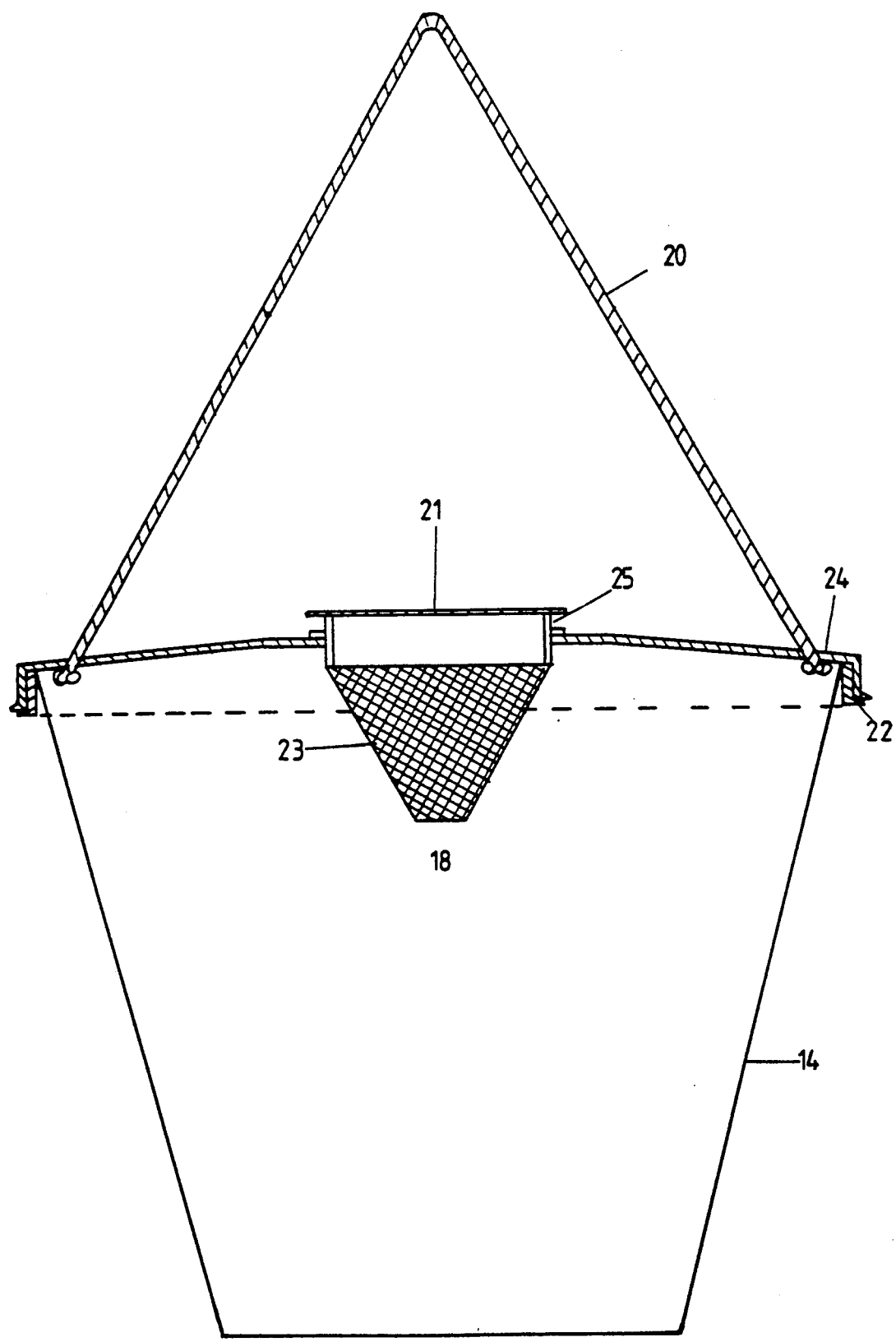
FIG. 2 is a sectional side view of the assembled integers of FIG. 1 plus a canopy.

In FIGS. 1 and 2 an assembly includes a cover 10 which has an inlet 12 for insects attracted by bait in the bag 14, for example. A canopy 21 is provided over the inlet and a downwardly-depending conical mesh formation 23 with a hole 18 at its apex extends into the bay so that insects, once attracted into the bag, find it impossible to escape. The canopy 21 also provides protection against the weather and a cord 20 provided for suspension of the cover and the inlet is protected against weather by a canopy 21. A flanged ring-like element 22 is provided which fits neatly behind a downwardly-depending flange 24 of the cover so that a bag 14 may be anchored between the element 22 and the flange 24.

The bag 14 includes a line of weakness 26 which extends around the bag and also includes lines of weakness 28 at right angles to the line 26. These are provided so that the bag can be tidied after location and anchorage.

It is an easy matter to disengage the element 22 and flange 24 for removal of a bag so that it can be replaced with a fresh one.

Figure 3:
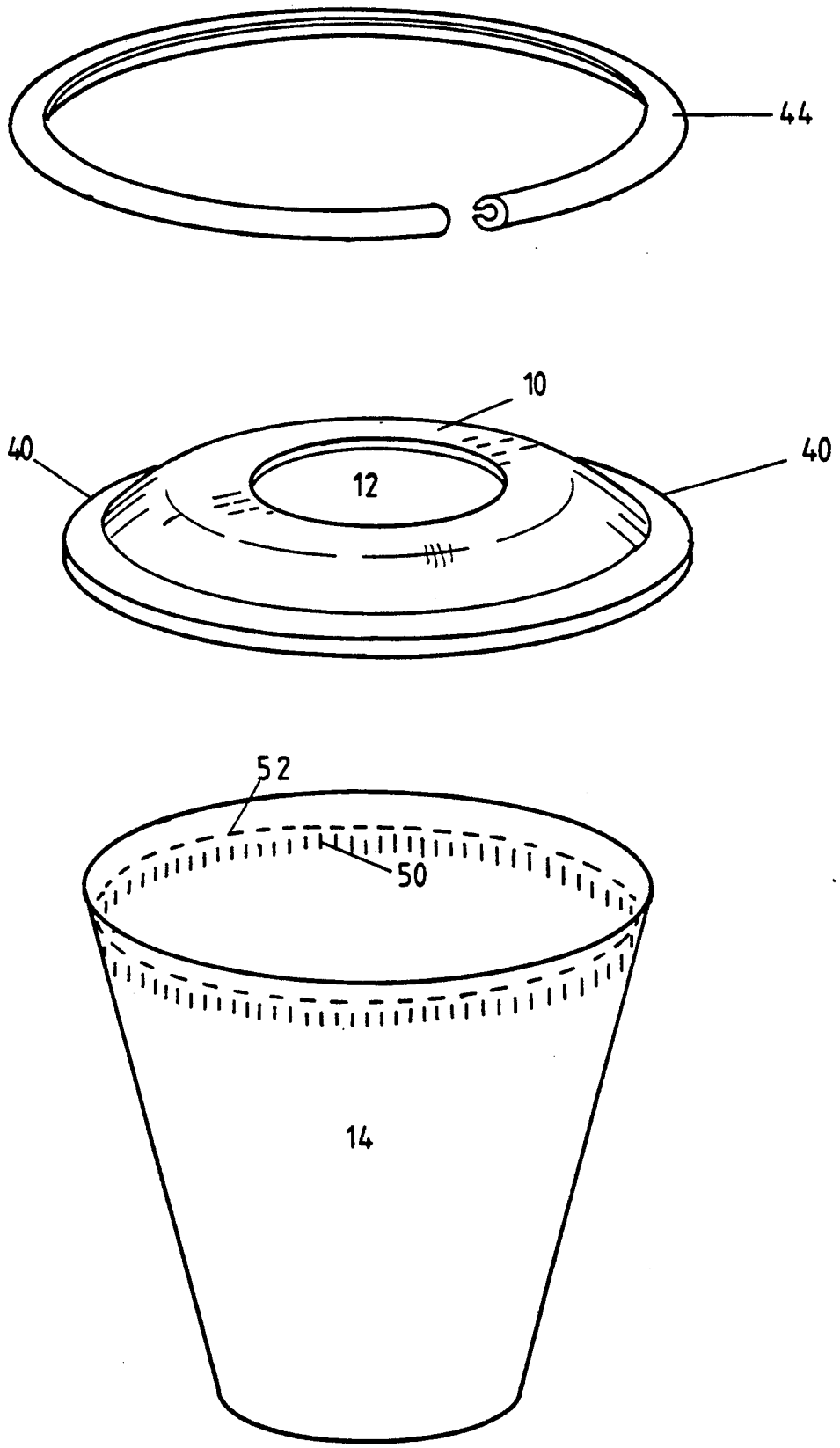
FIG. 3 is an exploded isometric view of another assembly according to the invention.
Figures 4, 5:
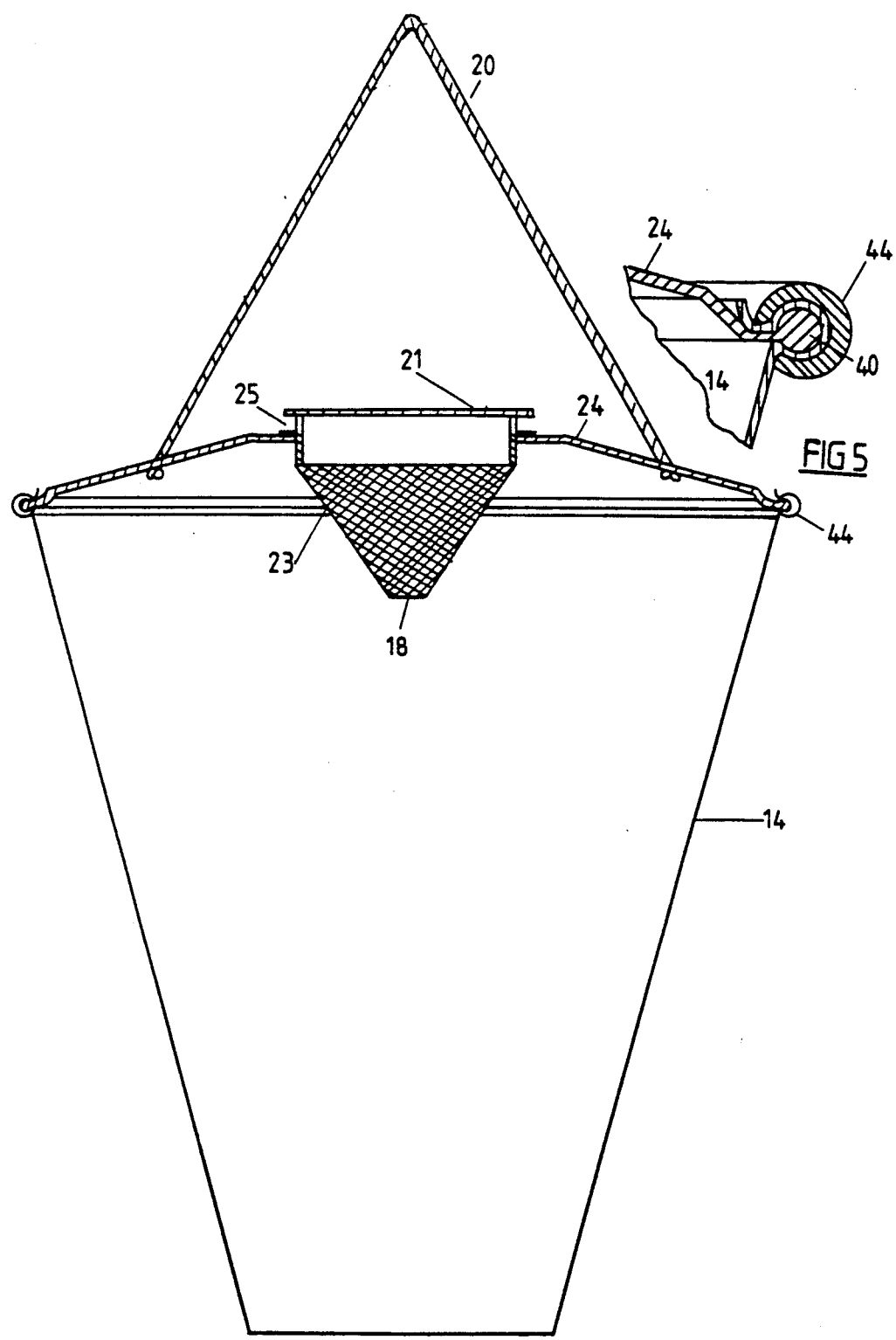
FIG. 4 is a sectional side view of the assembled integers of FIG. 3 plus a canopy.
FIG. 5 is an enlarged fragment of FIG. 4.

Referring now to FIGS. 3 and 4 where like references relate to the same or similar integers, the periphery of the cover 10 is ridged at 40, the shape of the ridge conforming to the interior of a ring-like flexible element 44 so that the bag may be anchored between the ridge and the element as shown in FIG. 4.

The element 44 is substantially C-shaped in cross section with an opening which is smaller than the ridge 40 thereby necessitating a force fit as more clearly shown in the enlarged insert.

The element is preferably made from a suitable polymeric material for flexibility both longitudinally and transversally.

The bag in this case includes a band constituted by a plurality of vertical slits 50. This band is located on the ridge 40 when the bag is pulled on to the ridge and the expansion afforded by the slits ensures that the bag is located with the band corresponding with the ridge. The element 44 is then forced over the ridge and then and the mouth of the bag is then torn along the lines of weakness 52.

We claim:

1. An assembly for an insect trap including a curvilinear cover member having an inlet for attracted insects, the inlet being adapted to prevent return of trapped insects through the inlet, and a bag having a mouth, the bag having a band below the mouth, the band being peripherally expandable to be forced over the periphery of the cover and to conform with the shape of said periphery, and a ring-like element C-shaped in cross section, adapted to clamp the mouth of the bag between said element and the cover.

2. The assembly according to claim 1, in which the bag has a line of weakness peripherally below said mouth.

* * * * *